United States Patent Office 3,458,089
Patented July 29, 1969

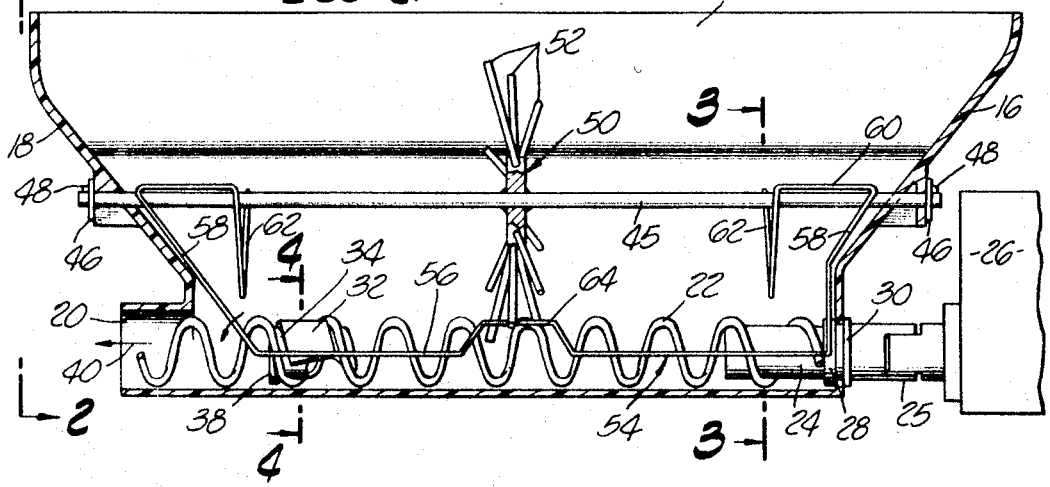

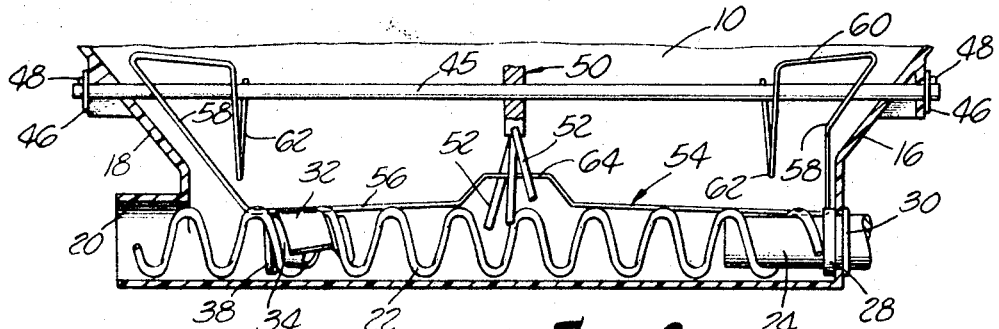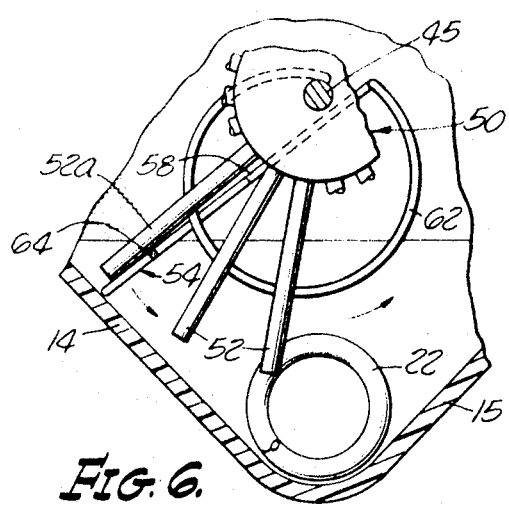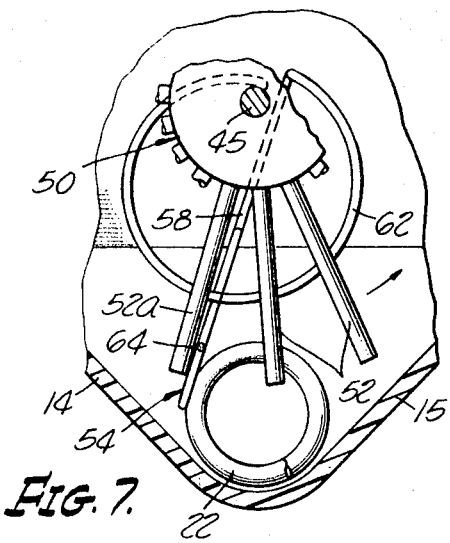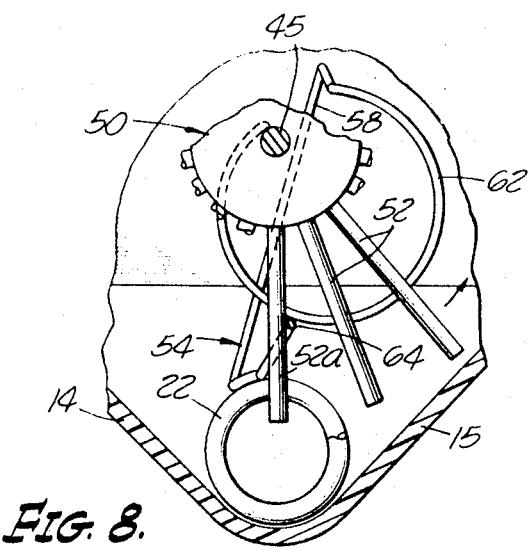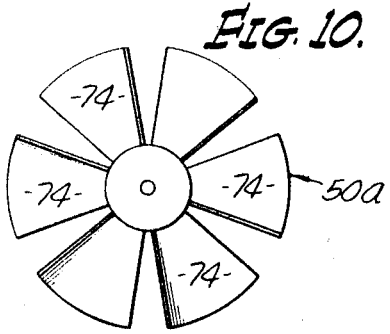
DARWIN B. MAXSON
DELBERT I. MORRISON
INVENTORS.

3,458,089
POWDERED MATERIAL DISPENSER
Darwin B. Maxson, Downey, and Delbert I. Morrison, Compton, Calif., assignors to Columware, Inc., Lynwood, Calif., a corporation of California
Filed Nov. 3, 1967, Ser. No. 680,467
Int. Cl. G01f 11/00, 11/46, 11/20
U.S. Cl. 222—231                              18 Claims

ABSTRACT OF THE DISCLOSURE

A hopper with a longitudinal conveyor screw leading to a discharge outlet has agitator means on a longitudinal shaft spaced radially from the conveyor screw. The agitator means comprises a resilient wire having a longitudinal portion moving in an orbit around the shaft with radial end portions of the wire connected to the opposite ends of the shaft. The orbitally moving longitudinal portion of the wire scrapes the walls of the hopper and scrapes over the conveyor screw with a snap action. An actuator wheel mounted on the agitator shaft for rotation thereof is driven by the conveyor screw in the same manner that a worm gear is driven by an associated worm and further serves the purpose of agitating the material in the hopper.

BACKGROUND OF THE INVENTION

In a horizontally extending hopper for dispensing finely divided material, for example, dispensing powdered chocolate for use in chocolate drinks, it is common to provide a conveyor screw inside the hopper to move the powdered material to a discharge port at one end of the hopper. In such an arrangement, however, the powdered material tends to bridge over the conveyor screw to make the major portion of the powdered material immune to the action of the conveyor screw. The need, therefore, is for some type of agitator means in the hopper to break up such bridges and to keep the powdered material fluffy for continuous gravitation into the zone of the horizontal conveyor screw.

It is old to use a squirrel-cage type agitator in such a longitudinal hopper with the agitator rotating on an axis transverse to the longitudinal axis of the hopper but such a squirrel-cage agitator has a number of disadvantages. In the first place, a squirrel-cage type agitator is relatively high in silhouette if it is designed for effective agitation of the powdered material and such a high silhouette will not fit well into a horizontally elongated hopper configuration. In the second place, a squirrel-cage type agitator encounters substantial resistance to rotation by the powdered material and, therefore, imposes a substantial load on the power means for actuating the hopper mechanism. A third disadvantage is that a squirrel-type agitator with its axis perpendicular to the axis of the conveyor screw does not lend itself to agitating the powdered material throughout the full length of a horizontally elongated hopper. One of the objects of the present invention is to provide an agitator mechanism that avoids these three disadvantages of a squirrel-type agitator.

A further problem met by the present invention is to provide an agitator mechanism that scrapes the walls of the conveyor and acts on the powdered material close to the conveyor screw on opposite sides thereof. Another problem met by the invention is to simplify the construction of such a dispensing device by avoiding either the need for a separate power means for the agitator mechanism or the need for external gearing to drive the agitator mechanism.

A still further problem to be met arises when a hopper is made of a plastic material and a shoulder of the conveyor screw abuts an inner surface of the plastic hopper to prevent axial movement of the conveyor screw in one direction. The particles of the powdered material and especially grains of sugar act as an abrasive between the shoulder of the conveyor screw and the hopper wall with consequent destructive wear on the hopper wall that drastically shortens the service life of the hopper.

An additional problem to be met is to provide a sanitary agitator means in the sense that the agitator means has smooth surfaces of convenient access with no troublesome crevices to trap the powdered material.

In addition to meeting all of these problems, the invention provides an agitator mechanism that is highly efficient, reliable and durable but nevertheless is of economical construction.

SUMMARY OF THE INVENTION

For the purpose of acting on the powdered material in a substantially uniform manner along the whole length of a horizontal hopper that is provided with a horizontal conveyor screw, a driven shaft is positioned above the conveyor screw parallel thereto and a yielding agitator member is mounted on the shaft with the major portion of the agitator member extending lengthwise of the hopper and moving in a circular orbit about the axis of the elevated shaft. In the preferred practice of the invention the agitator member is of yielding construction and comprises simply a length of smooth non-corrosive spring wire bent to form two radial arms at its opposite ends for connection to the opposite ends of the elevated shaft. For built-in yielding action, each of the two spring wire arms is in the form of a loop, the two loops being preferably oriented for expansion in response to momentary blockage of the orbital movement of the wire.

One important advantage of using such a looped wire for the agitator member is that it will not only yield or distort circumferentially when the orbital movement is momentarily blocked, but will also yield or distort radially. By virtue of this fact, the two looped arms may be dimensioned to cause the longitudinal portion of the wire to scrape inner surfaces of the hopper. For this purpose the radial extent of the two looped arms when the wire member is unrestrained is greater than the distance from the agitator shaft to a hopper wall that is to be scraped. When the intermediate longitudinal portion of the wire reaches the wall, the resulting frictional resistance makes the wire lag slightly in its orbital movement until cumulative stress in the looped arms is sufficient to overcome the friction.

A further important advantage of the circumferential and radial yielding action of the agitator wire is that it may be dimensioned for an orbit extending into the zone of the conveyor screw since the agitator wire is capable of hurdling the conveyor screw when it encounters the conveyor screw. Thus, the agitator wire may have an orbital radius sufficient to cause the agitator wire to scrape the conveyor screw itself as well as the hopper walls close to the conveyor screw on opposite sides of the conveyor screw.

With reference to actuation of the agitator wire, an important feature of the preferred embodiment of the invention is the concept of providing the agitator shaft inside the hopper with an actuator wheel that derives power from the conveyor screw in the same manner that a worm gear derives power from an associated rotary worm. This concept may be carried out by fixedly mounting on the agitator shaft an actuator wheel of the general configuration of a rotary fan with the blades of the fan configuration inclined for cam-action propulsion by the conveyor screw. Such a fan-shaped actuator wheel may be desirable in some installations because it causes highly effective agitation of the finely divided material by tending by screw action to move a whole cross section of the powdered material bodily towards one end of the hopper, for example, towards the discharge end of the hopper.

The penalty of providing such a screw action over a large radius of the finely divided material, however, is that a substantial load is placed on the agitator shaft and in most instances minimizing of such a load is important. In the preferred practice of the invention the agitator load is kept at a minimum by using an actuator wheel on the agitator shaft that is formed with a circumferential series of radial spokes arranged in sets of three, each set of three spokes conforming to the configuration of a fan blade. The relatively thin spokes pass through the finely divided material with relatively little resistance.

A further feature of the preferred practice of the invention is the concept of making the radius of the orbital movement of the agitator wire large enough to extend close to both sides of the conveyor screw and to employ the actuator wheel on the agitator shaft to boost the agitatotr wire over the conveyor screw. For this purpose the agitator wire extends between two spokes of the actuator wheel and is locally offset towards the agitator shaft for boosting action by one of the spokes, the boosting action involving cam action on the wire by the spoke.

The various features and advantages of the invention may be understood from the following detailed description and the accompanying drawings.

BRIEF DESCRIPTION OF THE DRAWINGS

FIG. 1 is a longitudinal sectional view of the presently preferred embodiment of the invention;

FIG. 2 is an end elevation of the device as seen along the line 2—2 of FIG. 1 with a portion of the end wall broken away;

FIG. 3 is an enlarged fragmentary sectional view as taken along the line 3—3 of FIG. 1;

FIG. 4 is an enlarged fragmentary sectional view taken along the line 4—4 of FIG. 1 showing a flow regulating member in cross section;

FIG. 5 is a transverse sectional view similar to the fragmentary section of FIG. 3 showing the orbital path of the longitudinal portion of the agitator wire;

FIGS. 6, 7, and 8 are fragmentary cross sectional views similar to FIG. 3 showing successive stages in the operation of the agitator wire;

FIG. 9 is a longitudinal section similar to FIG. 1 with the agitator at the stage shown in FIG. 8; and FIG. 10 is an elevational view of a modified form of actuator wheel which has the configuration of a rotary fan.

DESCRIPTION OF THE EMBODIMENT OF THE INVENTION

In the present embodiment of the invention a horizontally elongated hopper made of suitable plastic material such as high impact styrene has two opposite side walls 10 and 12, two convergent bottom walls 14 and 15, a rear wall 16, and a front wall 18 that is formed with a tubular discharge port 20. A conveyor screw 22 comprising a helically formed wire or rod extends along the bottom of the valley that is formed by the two convergent bottom walls 14 and 15 and extends into the tubular discharge portion 20 to discharge the material in the hopper through the discharge port. In this particular embodiment of the invention the content of the hopper is chocolate powder for use in mixing chocolate drinks.

The conveyor screw 22 is mounted on a stub shaft 24 that extends through the rear wall 16 of the hopper and is connected by a coupling 25 to a suitable motor 26. To hold the conveyor screw against axial movement in reaction to the force that is transmitted to the powdered material, a circumferential flange 28 of the stub shaft 24 forms a circumferential shoulder in abutment against the end wall 16 and an O-ring 30 that is seated in a circumferential groove of the stub shaft abuts the outer surface of the end wall. The O-ring 30 may be easily removed to permit withdrawal of the conveyor screw from the hopper whenever desired.

When the motor 26 actuates the conveyor screw 22 the powdered chocolate flows through the outlet port 20 at some given rate and a timer means (not shown) may be used to energize the motor 26 for a predetermined period of time, thereby to cause a predetermined increment of powdered chocolate to be dispensed through the outlet port. In a typical installation of the hopper, a suitable push button (not shown) starts a dispensing cycle and the discharge port 20 is connected to a suitable device for mixing a predetermined amount of liquid with the increment of chocolate powder to produce a chocolate drink. Such a mixing device is shown, for example, in the Martin et al. Patent No. 3,212,757.

In this particular embodiment of the invention the rate of flow through the discharge port 20 may be varied by varying the position of a flow regulating member 32 axially of the conveyor screw 22. The flow regulating member 32 comprises a short plastic sleeve which is formed with an outer spiral groove 34 whereby the plastic sleeve may be threaded into the conveyor screw 22 and may be rotated relative to the conveyor screw for adjustment axially of the conveyor screw. As shown in FIG. 4, the flow regulating member 32 may have a pair of diametrically opposite inner lugs 35 to permit rotary adjustment of the flow regulating member by an ordinary table knife, the table knife being inserted through the discharge port 20 to engage the two lugs. Thus, FIG. 4 indictates by dotted lines the position of a table knife 36 for engagement with the two lugs 35 to rotate the flow regulating member clockwise for axial retraction of the flow regulating member relative to the discharge port 20.

With the leading end 38 of the flow regulating member 32 retracted a substantial distance from the entrance to the discharge port 20, it is apparent that the powdered material that is propelled longitudinally of the hopper by the conveyor screw 22 will follow a discharge path through the discharge port 20 as indicated by the arrow 40. It is apparent that progressively shifting the flow regulating member 32 axially towards the discharge port 20 from the retracted position shown in FIG. 1 progressively retricts the flow of the material into the conveyor screw at the discharge port along the path indicated by the arrow 40, thus progressively reducing the rate of discharge from the hopper.

In accord with the teachings of the invention, an agitator shaft 45 carrying suitable agitator means is journalled at its opposite ends in the two end walls 16 and 18 of the hopper, the shaft being substantially parallel with the axis of the conveyor screw 22. In the construction shown, a flat washer 46 abuts the outer surface of each end wall, the washer being retained by a suitable cotter pin 48.

For actuation of the agitator shaft 45, what may be termed an actuator wheel 50 is fixedly mounted on the agitator shaft to be operated by the conveyor screw 22 in the same manner that a worm gear is operated by an associated rotary worm. For this purpose the actuator wheel 50 is formed with eighteen radial spokes 52 which are divided into six sets of three each, the three spokes of each set conforming to the configuration of a fan blade of a rotary fan. Thus, rotation of the conveyor screw 22 in a direction to propel the powdered material towards the discharge outlet 20 causes the conveyor screw to move against the successive sets of radial spokes 52 with cam action that causes rotation of the actuator wheel. In this instance the conveyor screw 22 rotates clockwise as viewed in FIGS. 2–8 with consequent counterclockwise rotation of the actuator wheel 50 and the agitator shaft 45 on which the agitator wheel is mounted.

It is to be understood that various specific agitator means may be mounted on the agitator shaft 45 within the scope of the invention. In this particular embodiment, the agitator means comprises a smooth resilient wire, generally designated 54, of non-corrosive material which is resiliently flexible, the wire being formed with two arms at its opposite ends which are fixedly attached to opposite ends of the agitator shaft 45, the purpose of the two arms being to move an intermediate longitudinal portion 56 of the wire in an orbit about the axis of the agitator shaft. Each of the two arms has a portion 58 which follow the corresponding end wall of the hopper, an adjacent portion 60 that extends close to the agitator shaft longitudinally thereof, and, finally, an end portion which is formed into a circular loop 62 to function in the general manner of a coil spring.

The intermediate longitudinal portion 56 of the agitator wire 54 is formed with a central offset 64, the offset being radially inward towards the agitator shaft 45. FIGS. 6, 7, and 8 show successive stages in the approach of the longitudinal portion 56 of the agitator wire to the conveyor screw 22 which, as heretofore noted, is an obstacle in the path of orbital movement of the agitator wire. In FIG. 7 the longitudinal portion 56 of the agitator wire has made contact with the conveyor screw 22 approximately on the level of the axis of the conveyor screw but the offset 64 which is in contact with a spoke 52a of the actuator wheel 50 is spaced substantially above the level of the axis of the conveyor screw. Because the offset 64 is elevated it is not seriously hindered by the presence of the conveyor screw and is readily forced across and over the conveyor screw to drag the rest of the longitudinal portion of the agitator wire with it.

A feature of the described structural arrangement is that if the offset 64 of the agitator wire is forced slightly beyond the point shown in FIG. 7, the cooperating spoke 52a of the actuator wheel functions as a cam to lift the wire offset substantially above the conveyor screw 22 as shown in FIG. 8. This upward lift by cam action distorts the longitudinal portion 56 of the agitator wire as may be seen in FIG. 9 to boost the agitator wire over the conveyor screw. The agitator wire yieldingly resists the boosting action and consequently snaps downwardly to its normal configuration when it clears the crest of the conveyor screw, FIG. 2 showing the position of the longitudinal portion 56 of the agitator wire as the snap action is completed.

It is important to note that when the agitator wire 54 is not under restraint, the radial distance of the longitudinal portion 56 of the wire from the agitator shaft 45 is greater than the radial distance of at least one of the longitudinal walls of the hopper from the agitator shaft. In this particular embodiment of the invention the unrestrained radius of the agitator wire is greater than the distance of the longitudinal hopper walls 12, 14, and 15 from the agitator shaft 45. As a consequence, the orbital path of movement of the longitudinal portion 56 of the agitator wire is of the character indicated by the continuous broken line in FIG. 5.

The upper portion 65 of the orbital path is circular because throughout this portion of the orbit the agitator wire is free from restraint. During the next portion 66 of the orbital path the agitator wire is distorted radially inwardly and therefore scrapes along the inner surface of the hopper wall 14. During the portion 68 of the orbital path the conveyor wire is distorted by contact with the conveyor screw 22 and scrapes across the upper portion of the conveyor screw. After the snap action of the conveyor wire it is distorted radially inwardly and scrapes the hopper wall 15 throughout the portion 70 of the orbital path. Finally, the agitator wire scrapes a lower portion of the hopper wall 12.

FIG. 10 shows an actuator wheel 50a which may be substituted for the above described actuator wheel 50. The actuator wheel 50a is of the configuration of a rotary fan having radial blades 74 which are inclined from the plane of rotation as required for actuation by the conveyor screw 22. The agitator wire extends between two of the radial blades 74 and is acted upon by the actuator wheel in the previously described manner.

What is claimed is:

1. In a hopper having a discharge port with a conveyor screw inside the hopper to move material in the hopper towards the discharge port,
   the improvement for agitating the material, comprising:
   agitator means journalled on an axis spaced from the screw conveyor means and substantially parallel thereto; and
   rotary drive means operatively connected to said agitator means for actuation thereof,
   said rotary drive means having a circumferential series of projections at various angles relative to a plane of rotation and extending peripherally into a radial zone of the conveyor screw and operatively engaging the conveyor screw in the manner that a worm gear engages a worm whereby the rotary drive means is actuated by the conveyor screw.

2. An improvement as set forth in claim 1 in which said rotary drive means has a circumferential series of sets of spokes, each set of spokes being aligned to conform to the configuration of a fan blade.

3. An improvement as set forth in claim 1 in which said rotary drive means has a circumferential series of blades similar to fan blades to engage the screw conveyor means for actuation thereby and to cause local movement of material in the hopper in one longitudinal direction.

4. An improvement as set forth in claim 1 in which said agitator means is a flexible means extending longitudinally of the hopper to move about said axis in an orbital path that is blocked by the conveyor screw,
   whereby movement of the agitator means past the conveyor screw requires flexure of the agitator means to clear the conveyor screw.

5. An improvement as set forth in claim 4 in which a portion of said rotary drive means extends into said orbital path to engage the flexible agitator means to boost and flex the agitator means past the conveyor screw.

6. An improvement as set forth in claim 4 in which said rotary drive means has a circumferential series of sets of spokes, each set of spokes being aligned to conform to the configuration of a fan blade, said agitator means extending between two successive spokes of the rotary drive means for boosting action by one of the two spokes.

7. An improvement as set forth in claim 6 in which the rotary drive means is positioned and dimensioned for said one spoke to shift the agitator means towards the rotary drive means by cam action in the course of the boosting action.

8. An improvement as set forth in claim 1 in which said agitator means and said rotary drive means are mounted on a common shaft; and
   in which said agitator means extends longitudinally of the hopper and has looped resilient opposite end portions connected to the shaft.

9. An improvement as set forth in claim 1 in which said agitator means and said rotary drive means are mounted on a shaft with two end portions of the agitator means extending outwardly from the shaft and with an intermediate portion of the agitator means extending longitudinally of the hopper to move in an orbit about the shaft.

10. An improvement as set forth in claim 9 in which the radius of the orbit at the unrestrained configuration of the agitator means is greater than the distance of at least one wall of the hopper from the shaft whereby the intermediate portion of the agitator means scrapes said wall.

11. An improvement as set forth in claim 9 in which the hopper has two convergent bottom walls both of which are spaced from the shaft by a distance less than said radius whereby both bottom walls are scraped by the intermediate portion of the agitator means.

12. In a hopper having a discharge port with a conveyor screw inside the hopper to move the material in the hopper towards the discharge port, the improvement for agitating the material in the hopper, comprising:

a power actuated shaft spaced from the conveyor screw and substantially parallel thereto;

agitator means mounted on said shaft with a longitudinal portion of the agitator means normally spaced radially from the shaft by a distance greater than the distance of the conveyor screw from the shaft whereby the agitator means moves in an orbital path that is blocked by the conveyor screw, said agitator means being yieldable to climb over the conveyor screw with a snap action.

13. An improvement as set forth in claim 12 in which said hopper is substantially horizontal and has two convergent longitudinal bottom walls forming a longitudinal valley in the hopper;

in which the conveyor screw extends along said valley; and in which the distance of said bottom walls from the shaft is less than the radius of the yieldable agitator means at its unrestrained configuration whereby the agitator means scrapes both of said bottom walls close to the conveyor screw.

14. An improvement as set forth in claim 12 in which said agitator means is a resilient wire having two end portions connected to the shaft and having an intermediate longitudinal portion spaced from the shaft to move along said orbital path.

15. An improvement as set forth in claim 12 in which said end portions of the wire are of looped configuration for spring action when the intermediate portion of the wire encounters the conveyor screw.

16. An improvement as set forth in claim 12 in which a rotary drive means is mounted on said shaft and is shaped and dimensioned to be driven by the conveyor screw in the manner that a worm gear is driven by a cooperating worm.

17. An improvement as set forth in claim 16 in which said rotary drive means is shaped and dimensioned to boost the intermediate portion of the resilient wire over the conveyor screw.

18. An improvement as set forth in claim 17 in which said intermediate portion of the resilient wire has a portion offset towards the shaft for engagement by said rotary drive means when the intermediate portion of the wire encounters the conveyor screw.

References Cited

UNITED STATES PATENTS

| | | | |
|---|---|---|---|
| 721,732 | 3/1903 | Nance | 222—231 |
| 1,548,558 | 7/1925 | Shutterly | 222—231 |
| 2,753,089 | 7/1956 | Phillips | 222—231 XR |
| 3,013,701 | 12/1961 | Joschko. | |

FOREIGN PATENTS 97,251   10/1939   Sweden.

WALTER SOBIN, Primary Examiner

U.S. Cl. X.R.

222—238, 294, 413